(12) United States Patent
Huebner

(10) Patent No.: US 11,891,161 B2
(45) Date of Patent: Feb. 6, 2024

(54) AIRCRAFT

(71) Applicant: Dr. Ing. h.c. .F. Porsche Aktiengesellschaft, Stuttgart (DE)

(72) Inventor: Stephan Andreas Huebner, Friolzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 99 days.

(21) Appl. No.: 17/548,693

(22) Filed: Dec. 13, 2021

(65) Prior Publication Data

US 2022/0185444 A1    Jun. 16, 2022

(30) Foreign Application Priority Data

Dec. 15, 2020  (DE) .................... 10 2020 133 540.7

(51) Int. Cl.
*B64C 1/06* (2006.01)
*B64C 27/00* (2006.01)
*B64C 29/00* (2006.01)

(52) U.S. Cl.
CPC ............ *B64C 1/062* (2013.01); *B64C 1/069* (2013.01); *B64C 27/006* (2013.01); *B64C 29/0016* (2013.01)

(58) Field of Classification Search
CPC ....... B64C 1/062; B64C 27/006; B64D 45/06; B64D 25/00; B64U 20/30
See application file for complete search history.

(56) References Cited

U.S. PATENT DOCUMENTS

| | | | | |
|---|---|---|---|---|
| 3,718,295 | A * | 2/1973 | Moore | B64C 1/062 244/119 |
| 5,542,626 | A * | 8/1996 | Beuck | B64C 1/062 244/119 |
| 5,992,794 | A | 11/1999 | Rotman et al. | |
| 2011/0297785 | A1* | 12/2011 | Itakura | B64C 1/062 244/119 |

FOREIGN PATENT DOCUMENTS

| | | |
|---|---|---|
| DE | 102015218456 A | 3/2017 |
| DE | 102018201543 A1 | 8/2019 |
| DE | 102018116161 A | 1/2020 |

* cited by examiner

*Primary Examiner* — Nicholas McFall
(74) *Attorney, Agent, or Firm* — LEYDIG, VOIT & MAYER, LTD.

(57) ABSTRACT

An aircraft includes a fuselage that provides an aircraft passenger cell and a plastically deformable protective body secured on the fuselage. The plastically deformable protective body can be secured on the bottom of the fuselage and/or laterally on the fuselage. The plastically deformable protective body can be secured releasably on the fuselage, for example, via a screw connection.

11 Claims, 1 Drawing Sheet

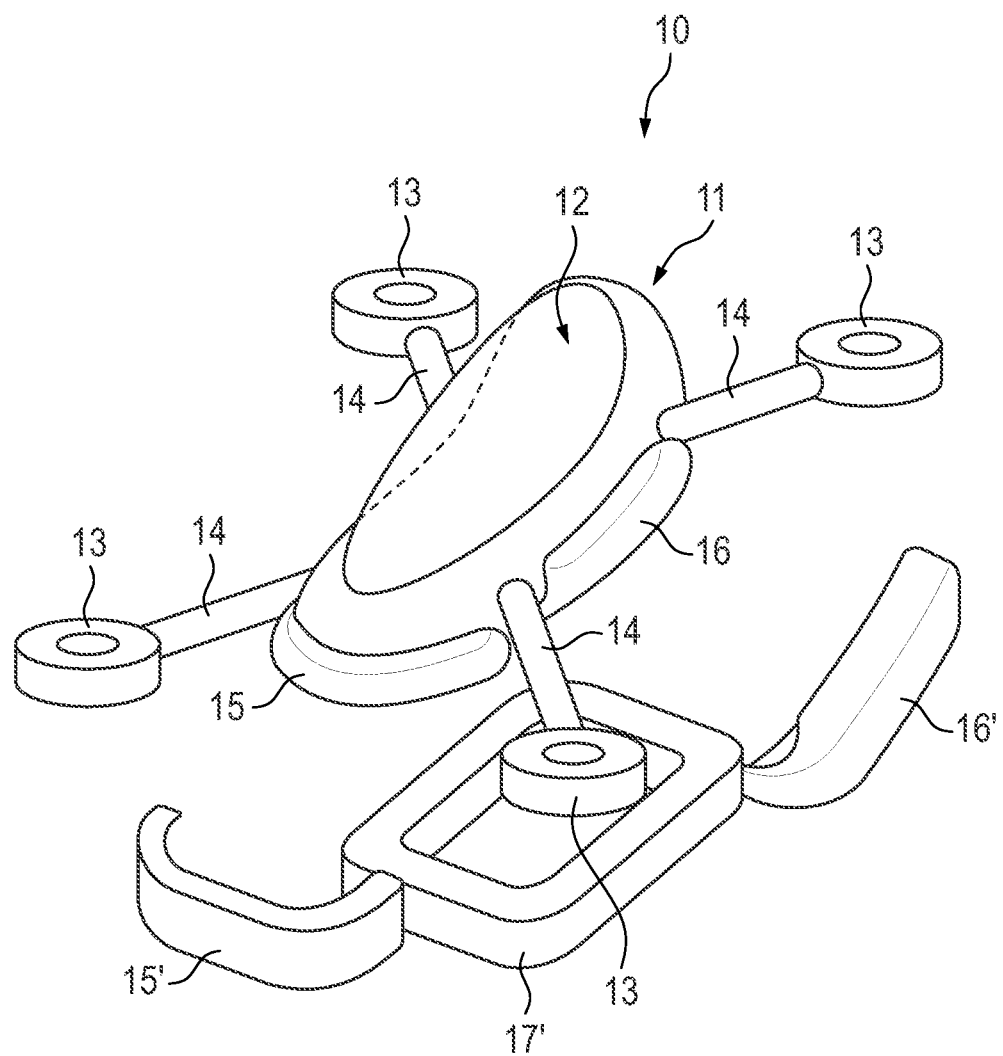

AIRCRAFT

CROSS REFERENCE TO RELATED APPLICATIONS

This application claims benefit to German Patent Application No. DE 10 2020 133 540.7, filed on Dec. 15, 2020, which is hereby incorporated by reference herein.

FIELD

The present disclosure relates to an aircraft.

BACKGROUND

DE 10 2018 116 161 A1 discloses an aircraft designed as a vertical take-off aircraft having a fuselage and an aircraft passenger cell provided by the fuselage. The aircraft passenger cell is also referred to as a passenger cabin.

When such an aircraft makes a hard landing, the fuselage and thus the aircraft passenger cell of the aircraft may be damaged. This is disadvantageous.

U.S. Pat. No. 5,992,794 A discloses an aircraft designed as a helicopter which has inflatable airbags on an underside of the fuselage. Depending on flight conditions, these airbags can be inflated to provide protection.

DE 10 2015 218 456 A1 discloses a further aircraft having a collision protection device designed as a deployable envelope.

SUMMARY

In an embodiment, the present disclosure provides an aircraft. The aircraft includes a fuselage that provides an aircraft passenger cell and a plastically deformable protective body secured on the fuselage.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

The FIGURE shows a schematic, perspective view of an aircraft.

DETAILED DESCRIPTION

There is a need to better protect an aircraft.

The present disclosure provides a novel aircraft.

According to the present disclosure, at least one plastically deformable protective body is secured on the fuselage of the aircraft.

The present disclosure proposes to secure a plastically deformable protective body on a fuselage of a manned aircraft which has an aircraft passenger cell or passenger cell.

This plastically deformable protective body provides a kind of crumple zone for the fuselage of the aircraft in order to absorb energy by plastic deformation of the respective protective body, during a hard landing for example. Forces and accelerations acting on the aircraft passenger cell and thus on passengers are thereby reduced. A further advantage is that the respective plastically deformable protective body secured on the fuselage provides buoyancy in the case of a landing on water, whether in the event of a deliberate or unintentional landing on water, and thus ensures the ability of the aircraft to float. Furthermore, such a plastically deformable protective body can be used to provide an insulating effect against noise in order to reduce the noise transmitted into the aircraft passenger compartment.

Preferably, at least one plastically deformable protective body is secured, in particular releasably, on the bottom of the fuselage and/or laterally on the fuselage. These mounting positions of a plastically deformable protective body, namely on an underside of the fuselage and/or on side walls of the fuselage, are particularly preferred in order to provide the protective effect for the fuselage and thus the aircraft passenger cell.

The respective plastically deformable protective body is preferably secured releasably on the body, in particular by means of a screw connection. Securing it releasably is of particular advantage in this case to enable a possibly damaged protective body to be replaced easily, more specifically without damage to the fuselage.

The respective plastically deformable protective body is preferably composed of a metal foam and/or synthetic foam, at least in some section or sections. A protective body of this kind is particularly preferred in order, on the one hand, to absorb energy by plastic deformation and, on the other hand, in order both to ensure the ability to float when landing on water and to reduce the sound or noise introduced into the aircraft passenger cell.

The disclosure relates to a manned aircraft. In particular, the disclosure relates to an aircraft designed as a "vertical take-off" aircraft, which lifts off vertically from the ground when taking off and lands vertically on the ground when landing.

The FIGURE shows a highly schematic perspective view of an aircraft 10 designed as a vertical take-off aircraft, wherein the aircraft 10 has a fuselage 11 which provides an aircraft passenger cell 12. Passengers are seated in the aircraft passenger cell 12. The aircraft passenger cell 12 is also referred to as a passenger cell.

The FIGURE furthermore shows propeller units 13, which are attached to the fuselage 11 by means of struts 14. These propeller units 13 may be ducted propellers which serve to propel the aircraft 10.

At least one plastically deformable protective body 15, 16, 17 is secured on the fuselage 11 of the aircraft 10.

By means of such a plastically deformable protective body 15, 16, 17, energy can be absorbed, particularly in the event of a hard landing or other undesirable events during flight, in order to reduce forces and accelerations acting on the fuselage 11 and thus on passengers and thus to protect the fuselage 11 as well as passengers in the aircraft passenger cell 12 of the fuselage 11.

The FIGURE shows a plurality of plastically deformable protective bodies 15, 16, 15', 16', 17'. Protective bodies 15, 16 are secured or mounted on the fuselage 11, and protective bodies 15', 16', 17' have been removed from the fuselage 11.

Protective body 15 is secured at the front on the bottom and protective body 16 is secured laterally on the bottom of the fuselage 11 of the aircraft 10. Protective body 17, 17' can be secured on an underside of the fuselage 11 adjacent to protective bodies 15, 16.

In the event of a hard landing or a collision with an obstacle, energy can be absorbed by the or by each protective body 15, 16, 17 mounted on the fuselage 11 by plastic deformation of the respective protective body 15, 16, 17.

Forces and accelerations acting on the fuselage 11 and on occupants of the aircraft passenger cell 12 are thereby reduced. A risk of damage to the fuselage 11 and a risk of injury to occupants of the aircraft passenger cell 12 can be reduced.

A further advantage of the protective bodies 15, 16, 17 is that they ensure that the aircraft 10 is able to float in the event of an intentional or unintentional landing on water.

Furthermore, the input of noise or structure-borne noise into the aircraft passenger cell 12 can be reduced by means of the protective bodies 15, 16 and 17.

The respective protective bodies 15, 16, 17 are preferably secured releasably on the fuselage 11, preferably by means of a screw connection. Thus, the respective protective body 15, 16, 17 can be mounted and dismounted in a simple manner to enable it to be replaced easily, after damage for example.

As a particular preference, the respective plastically deformable protective body 15, 16, 17 is formed from a foam material, such as a metal foam and/or synthetic foam, in some section or sections.

Protective bodies made of a foam material have a low weight, can advantageously absorb energy during plastic deformation and furthermore advantageously provide sound proofing as well as buoyancy during a water landing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aircraft, comprising:
    a fuselage configured for vertical takeoff and landing and to provide an aircraft passenger cell; and
    a plastically deformable protective body secured on the fuselage and configured to cover a lateral outermost periphery of the fuselage,
    wherein the fuselage is non-cylindrical and has a curvature relative to a longitudinal axis passing from a rear end of the fuselage to a front end of the fuselage.

2. The aircraft as claimed in claim 1, wherein the plastically deformable protective body is secured on the bottom of the fuselage.

3. The aircraft as claimed in claim 1, wherein the plastically deformable protective body is secured laterally on the fuselage.

4. The aircraft as claimed in claim 1, wherein the plastically deformable protective body is secured releasably on the fuselage.

5. The aircraft as claimed in claim 1, wherein the plastically deformable protective body comprises foam material.

6. The aircraft as claimed in claim 1, wherein the plastically deformable protective body comprises a metal foam.

7. The aircraft as claimed in claim 1, wherein the plastically deformable protective body comprises a synthetic foam.

8. The aircraft as claimed in claim 1, comprising an additional plastically deformable protective body secured on the fuselage and configured to cover a front-most periphery of the fuselage.

9. The aircraft as claimed in claim 1, wherein the plastically deformable protective body at least partially matches the curvature of the fuselage.

10. The aircraft as claimed in claim 1, further comprising a plurality of propeller units oriented to provide propulsion for vertical takeoff and landing.

11. The aircraft as claimed in claim 10, further comprising a plurality of struts by which the propeller units are attached to the fuselage.

* * * * *